(12) United States Patent
Fujimoto

(10) Patent No.: US 11,814,069 B2
(45) Date of Patent: Nov. 14, 2023

(54) VEHICLE CONTROL SYSTEM, DATA TRANSMITTING METHOD, AND RECORDING MEDIUM ON WHICH PROGRAM IS RECORDED

(71) Applicant: TOYOTA JIDOSHA KABUSHIKI KAISHA, Toyota (JP)

(72) Inventor: Takayuki Fujimoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 481 days.

(21) Appl. No.: 17/193,106

(22) Filed: Mar. 5, 2021

(65) Prior Publication Data

US 2021/0300408 A1    Sep. 30, 2021

(30) Foreign Application Priority Data

Mar. 25, 2020 (JP) ................... 2020-055169

(51) Int. Cl.
   *B60W 60/00*   (2020.01)
   *G06F 21/45*   (2013.01)
   *H04L 9/40*    (2022.01)

(52) U.S. Cl.
   CPC .......... *B60W 60/001* (2020.02); *G06F 21/45* (2013.01); *H04L 63/1408* (2013.01); *H04L 63/18* (2013.01)

(58) Field of Classification Search
   CPC ....... B60W 60/001; B60W 2050/0006; B60W 50/0098; B60W 60/00188; G06F 21/45; G06F 21/44; G06F 21/64; H04L 63/1408; H04L 63/18; H04L 67/12; H04L 63/1441; B60R 16/0232
   See application file for complete search history.

(56) References Cited

U.S. PATENT DOCUMENTS

| 2009/0044041 | A1 | 2/2009 | Armbruster et al. |
| 2020/0269869 | A1 | 8/2020 | Fujihira et al. |
| 2021/0061194 | A1* | 3/2021 | Sugawa ............... H04L 12/66 |

FOREIGN PATENT DOCUMENTS

| JP | 2008-505012 A | 2/2008 |
| JP | 2012-5003 A | 1/2012 |
| JP | 2013-048374 A | 3/2013 |
| JP | 2015-216469 A | 12/2015 |

(Continued)

*Primary Examiner* — Yuen Wong
(74) *Attorney, Agent, or Firm* — Oblon, McClelland, Maier & Neustadt, L.L.P.

(57) ABSTRACT

A vehicle control system includes a driving control device that controls a driving section for a vehicle; a control instructing device that controls the driving control device based on control signals transmitted to the driving control device; a first communication path that connects a plurality of control devices, which include the control instructing device and the driving control device, such that the plurality of control devices can communicate with one another, and that is connected to a vehicle exterior so as to be able to communicate therewith; and a second communication path that connects a plurality of control devices, which include the control instructing device and the driving control device, such that the plurality of control devices can communicate with one another, the second communication path being independent from the first communication path and being a network that is cut off from the vehicle exterior.

6 Claims, 6 Drawing Sheets

(56) References Cited

FOREIGN PATENT DOCUMENTS

| JP | 2017-47835 A | 3/2017 |
| JP | 2019-104339 A | 6/2019 |
| JP | 2019-125838 A | 7/2019 |
| JP | 2019-134301 A | 8/2019 |
| JP | 2020-129842 A | 8/2020 |

* cited by examiner

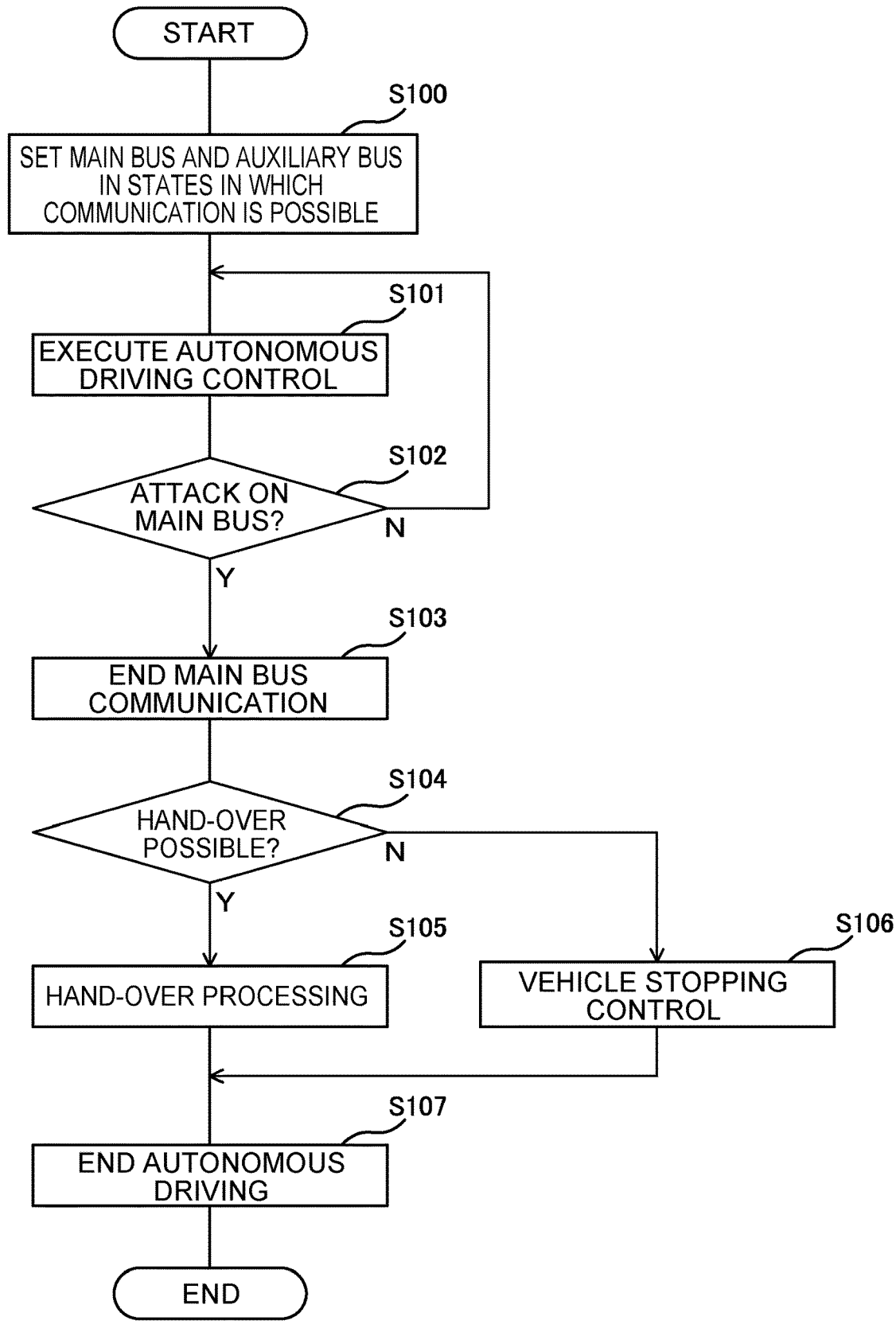

VEHICLE CONTROL SYSTEM, DATA TRANSMITTING METHOD, AND RECORDING MEDIUM ON WHICH PROGRAM IS RECORDED

CROSS-REFERENCE TO RELATED APPLICATION

This application is based on and claims priority under 35 USC 119 from Japanese Patent Application No. 2020-055169 filed on Mar. 25, 2020, the disclosure of which is incorporated by reference herein.

BACKGROUND

Technical Field

The present disclosure relates to a vehicle control system, a data transmitting method, and a recording medium on which a program is recorded.

Related Art

Japanese Patent Application Laid-Open (JP-A) No. 2017-047835 discloses an onboard network device that, even in a case in which complex control is carried out such as in autonomous driving, can sense unauthorized data traveling on the onboard network by a simple structure, without increasing the data processing loads at onboard devices. At this onboard network device, a communication monitoring section monitors the data that is passing through the network, and, in accordance with a judgement method set by a judgement method setting section, it is judged whether or not there is an abnormality in the data that is passing through the onboard network device.

On the other hand, there is the concern that control instructions will not be able to be transferred among the control devices in a case in which the in-vehicle network is attacked from a network at the exterior of the vehicle during the execution of autonomous driving.

SUMMARY

An object of the present disclosure is to provide a vehicle control system, a data transmitting method, and a recording medium on which a program is recorded, which can transfer control instructions among control devices even in a case in which an abnormality arises in communication of an in-vehicle network that can be connected to a network at the vehicle exterior so as to be able to communicate therewith.

A first aspect is a vehicle control system including: a driving control device that controls a driving section for vehicle traveling that is provided at a vehicle; a control instructing device that controls the driving control device on the basis of control signals transmitted to the driving control device; a first communication path that connects plural control devices, which include the control instructing device and the driving control device, such that the plural control devices can communicate with one another, and that is connected to a vehicle exterior so as to be able to communicate therewith; a second communication path that connects plural control devices, which include the control instructing device and the driving control device, such that the plural control devices can communicate with one another, and that is independent from the first communication path, and that is a network that is cut-off from the vehicle exterior; an outputting section that is provided at the control instructing device, and that can output the control signals to both the first communication path and the second communication path; and a receiving section that is provided at the driving control device, and that can receive the control signals from both the first communication path and the second communication path.

The first aspect is a vehicle control system in which, due to the control instructing device transmitting control signals to the driving control device, the driving control device drives a driving section and causes a vehicle to travel. This vehicle control system has a first communication path and a second communication path that connect control devices, which include the control instructing device and the driving control device, such that the control devices can communicate with one another. Here, the first communication path can communicate with the vehicle exterior, but the second communication path is independent from the first communication path, and is structured as a network that is cut-off from the vehicle exterior. Further, in this vehicle control system, the receiving section of the driving control device can receive control signals, which the outputting section of the control instructing device outputs to both the first communication path and the second communication path, from the both.

Therefore, in accordance with this vehicle control device, even in a case in which an abnormality arises in communication of the first communication path that is connected to a network at the vehicle exterior so as to be able to communicate therewith, the control signals that serve as control instructions can be transferred from the control instructing device to the driving control device by the second communication path.

In a vehicle control system of a second aspect, in the vehicle control system of the first aspect, the control instructing device has a generating section that generates an authentication code on the basis of the control signal, and the outputting section outputs the control signal, to which the authentication code is appended, to the first communication path, and outputs the control signal, without the authentication code appended thereto, to the second communication path.

In the vehicle control system of the second aspect, in a case in which the control instructing device transmits a control signal to the driving control device, the outputting section appends the authentication code, which is generated at the generating section, to the control signal and outputs the control signal to the first communication path, and the outputting section outputs the control signal, without the authentication code appended thereto, to the second communication path. Therefore, the communication load of the second communication path, which cannot communicate with networks at the exterior of the vehicle, can be lowered while the reliability of the control signals that are transferred through the first communication path, which is connected to a network at the vehicle exterior so as to be able to communicate therewith, is ensured. In accordance with this vehicle control system, ensuring of reliability of communication, and a reduction in the communication load, can both be devised at the system on the whole.

In a vehicle control system of a third aspect, the vehicle control system of the first or second aspect includes an attack sensing section that is provided at the control instructing device and the driving control device, and that senses an attack on the first communication path, wherein, in a case in which the respective attack sensing sections sense an attack, the control instructing device carries out communication with the driving control device via only the second communication path.

The vehicle control system of the third aspect is structured such that, in a case in which the attack sensing sections, which the respective control devices have, sense that there is an attack on the first communication path, communication between the control instructing device and the driving control device is carried out through the second communication path, with the first communication path being cut-off. In accordance with this vehicle control system, by providing the function of sensing an attack on the first communication path at each of the control devices, the sensing accuracy of the system on the whole can be improved, and even in a case in which there is an attack on the first communication path while the vehicle is traveling, traveling can be continued by communication of the second communication path.

In a vehicle control system of a fourth aspect, in the vehicle control system of any one of the first through third aspects, the control instructing device is an autonomous driving ECU, and the receiving section of the driving control device acquires the control signals, which relate to autonomous driving, from the control instructing device via the second communication path, and can acquire the control signals, which are other than those relating to autonomous driving, from the control instructing device via the first communication path.

In accordance with the vehicle control system of the fourth aspect, the processing loads of the respective control devices can be reduced by transmitting control signals relating to autonomous driving via the second communication path that is independent from the exterior. The reliability of the signals can be improved by transmitting the control signals, which relate to other than autonomous driving, via the first communication path.

A fifth aspect is a data transmitting method in which a control instructing device, which controls a driving control device that controls a driving section for vehicle traveling that is provided at a vehicle, transmits control signals to the driving control device, the method including: generating processing that generates an authentication code on the basis of the control signal; and outputting processing that outputs the control signal, to which the authentication code is appended, to a first communication path that connects plural control devices, which include the control instructing device and the driving control device, such that the plural control devices can communicate with one another, and that is connected to a vehicle exterior so as to be able to communicate therewith, and that outputs the control signal, without the authentication code appended thereto, to a second communication path that connects plural control devices, which include the control instructing device and the driving control device, such that the plural control devices can communicate with one another, and that is independent from the first communication path, and that is a network that is cut-off from the vehicle exterior.

The data transmitting method of the fifth aspect is applied to a case in which, due to a control instructing device transmitting control signals to a driving control device in a vehicle, the driving control device drives a driving section and causes the vehicle to travel. This data transmitting method carries out communication by using the first communication path and the second communication path. Here, the features of the first communication path and the second communication path are as described above. Further, in this data transmitting method, in a case in which the control instructing device transmits a control signal to the driving control device, in the outputting processing, the authentication code that is generated in the generating processing is appended to the control signal and the control signal is outputted to the first communication path, and the control signal, without the authentication code appended thereto, is outputted to the second communication path. Therefore, in accordance with this data transmitting method, even in a case in which an abnormality arises in communication on the first communication path that is connected to a network at the vehicle exterior so as to be able to communicate therewith, the control signals that serve as control instructions can be transferred from the control instructing device to the driving control device by the second communication path. Further, the communication load of the second communication path, which is connected so as to be unable to communicate with networks at the exterior of the vehicle, can be lowered while the reliability of the control signals that are traveling on the first communication path, which is connected to a network at the vehicle exterior so as to be able to communicate therewith, is ensured. In accordance with this data transmitting method, ensuring of reliability of communication, and a reduction in the communication load, can both be devised at the system on the whole.

A sixth aspect is a non-transitory recording medium on which a program is recorded. In this program, a control instructing device, which controls a driving control device that controls a driving section for vehicle traveling that is provided at a vehicle, transmits control signals to the driving control device, and the program causes a computer to execute processings including: generating processing that generates an authentication code on the basis of the control signal; and outputting processing that outputs the control signal, to which the authentication code is appended, to a first communication path that connects plural control devices, which include the control instructing device and the driving control device, such that the plural control devices can communicate with one another, and that is connected to a vehicle exterior so as to be able to communicate therewith, and that outputs the control signal, without the authentication code appended thereto, to a second communication path that connects plural control devices, which include the control instructing device and the driving control device, such that the plural control devices can communicate with one another, and that is independent from the first communication path, and that is a network that is cut-off from the vehicle exterior.

The program that is recorded on the non-transitory recording medium of the sixth aspect is applied to a case in which, due to a control instructing device transmitting control signals to a driving control device in a vehicle, the driving control device drives a driving section and causes the vehicle to travel. This program carries out communication by using the first communication path and the second communication path. Here, the features of the first communication path and the second communication path are as described above. Further, in this program, in a case in which the control instructing device transmits a control signal to the driving control device, a computer executes the following processings. Namely, in the outputting processing, an authentication code that is generated in the generating processing is appended to the control signal and the control signal is outputted to the first communication path, and the control signal, without the authentication code appended thereto, is outputted to the second communication path. Therefore, in accordance with this program, even in a case in which an abnormality arises in communication on the first communication path that is connected to a network at the vehicle exterior so as to be able to communicate therewith, the control signals that serve as control instructions can be transferred from the control instructing device to the driving control device by the second communication path. Further, the communication load of the second communication path, which is connected so as to be unable to communicate with networks at the exterior of the vehicle, can be lowered while the reliability of the control signals that travel on the first communication path, which is connected to a network at the vehicle exterior so as to be able to communicate therewith, is ensured. In accordance with this program, ensuring of reliability of communication, and a reduction in the communication load, can both be devised at the system on the whole.

In accordance with the present disclosure, control instructions can be transferred among control devices even in a case in which an abnormality arises in communication of an in-vehicle network that can be connected to a network at the vehicle exterior so as to be able to communicate therewith.

BRIEF DESCRIPTION OF THE DRAWINGS

An exemplary embodiment of the present disclosure will be described in detail based on the following figures, wherein:

FIG. 6 is a flowchart showing the flow of attack handling processings that are executed by the autonomous driving ECU.

DETAILED DESCRIPTION

Figure 1:
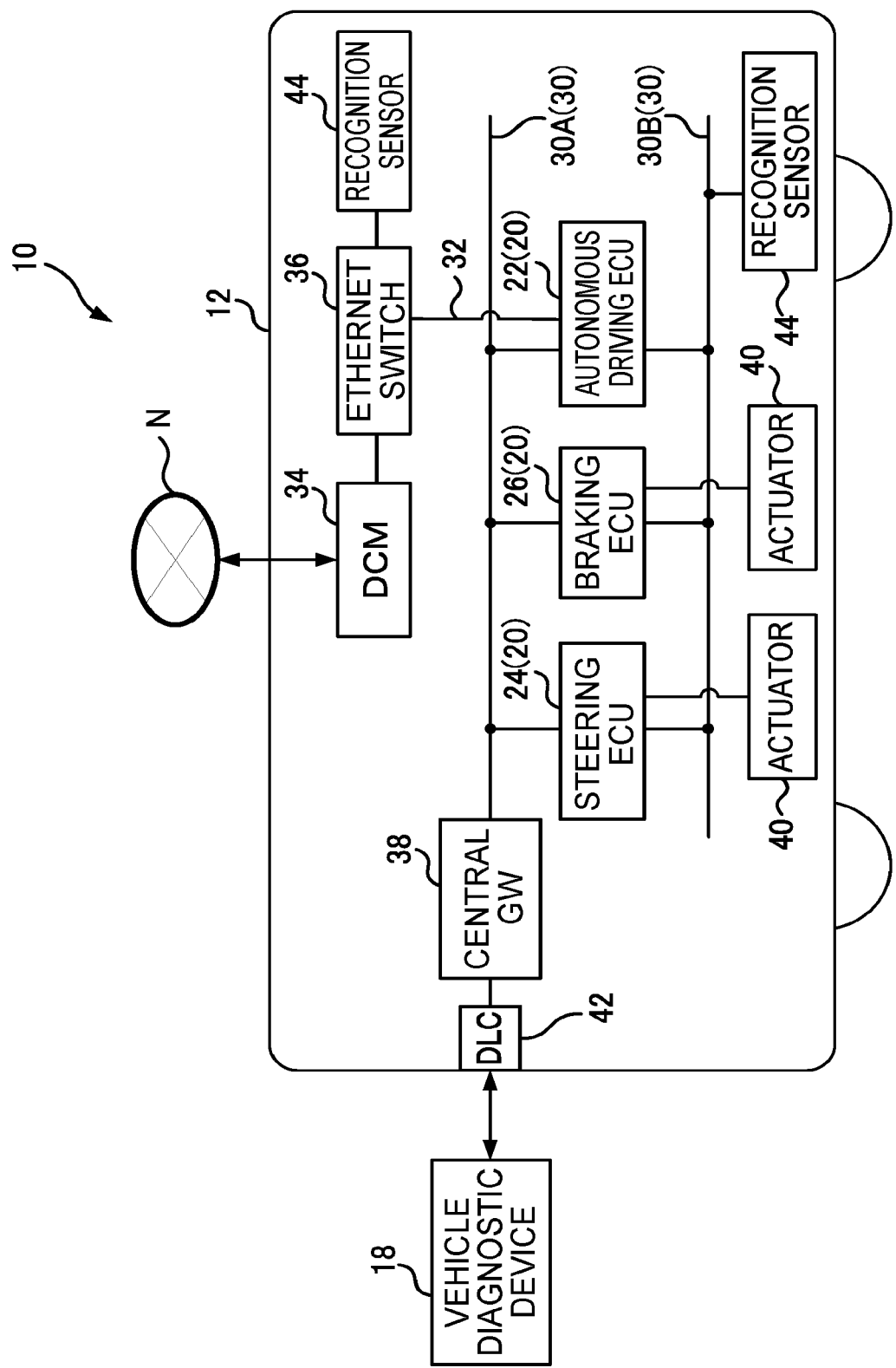
FIG. 1 is a drawing showing the schematic structure of a vehicle control system relating to an embodiment.

FIG. 1 is a block drawing showing the schematic structure of a vehicle control system 10 relating to an embodiment of the present disclosure.

(Basic Structure)

As shown in FIG. 1, the vehicle control system 10 relating to the present embodiment is provided at a vehicle 12 at which autonomous driving is possible.

The vehicle control system 10 of the present embodiment is structured to include plural ECUs (Electronic Control Units) 20, in-vehicle busses 30 that are communication paths that connect the plural ECUs 20 to one another, a DCM (Data Communication Module) 34, and a central GW (Central Gateway) 38.

The ECUs 20 function as control devices that control respective sections of the vehicle 12. The ECUs 20 include an autonomous driving ECU 22, a steering ECU 24, and a braking ECU 26. Note that, although not illustrated, the ECUs 20 include a body ECU, an engine ECU, a transmission ECU, a meter ECU, a multimedia ECU, a smart key ECU and the like. The autonomous driving ECU 22 is the ECU 20 for driving assist, and is an example of the control instructing device. Further, the steering ECU 24 and the braking ECU 26 are the ECUs 20 for driving control, and are examples of driving control devices.

Actuators 40 are connected to the steering ECU 24 and the braking ECU 26, respectively, and the respective actuators 40 are driven on the basis of control signals of the autonomous driving ECU 22. Namely, in the vehicle 12 of the present embodiment, autonomous driving is realized by the ECUs 20, such as the steering ECU 24 and the braking ECU 26 and the like, driving the actuators 40 on the basis of control signals transmitted from the autonomous driving ECU 22. The detailed structures of the ECUs 20 are described later.

The in-vehicle busses 30 that serve as the communication paths connect the respective ECUs 20 to one another. The in-vehicle busses 30 include a main bus 30A, which can connect to a network N at the exterior of the vehicle 12, and an auxiliary bus 30B, which is independent from the main bus 30A and is cut-off from external networks. In addition to the respective ECUs 20, the central GW 38 is connected to the main bus 30A. Further, in addition to the respective ECUs 20, recognition sensors 44 are connected to the auxiliary bus 30B.

At the in-vehicle busses 30, communication in accordance with CAN (Controller Area Network) protocol is carried out. The main bus 30A is an example of the first communication path, and the auxiliary bus 30B is an example of the second communication path.

The DCM 34 is provided as a communication device that connects the vehicle 12 and the network N that is a communication network. The DCM 34 is connected to the autonomous driving ECU 22 through an ethernet® bus 32. An ethernet switch 36 is provided on the ethernet bus 32 between the autonomous driving ECU 22 and the DCM 34. The recognition sensors 44 are connected to this ethernet switch 36.

The central GW 38 has the functions of managing the network and communicating data. The central GW 38 is connected only to the main bus 30A. Note that plural buses that are not illustrated are connected in addition to the main bus 30A.

The central GW 38 is connected to a DLC (Data Link Connector) 42. This DLC 42 can connect with a vehicle diagnostic device 18 that is a diagnosing tool.

(Autonomous Driving ECU)

Figure 2:
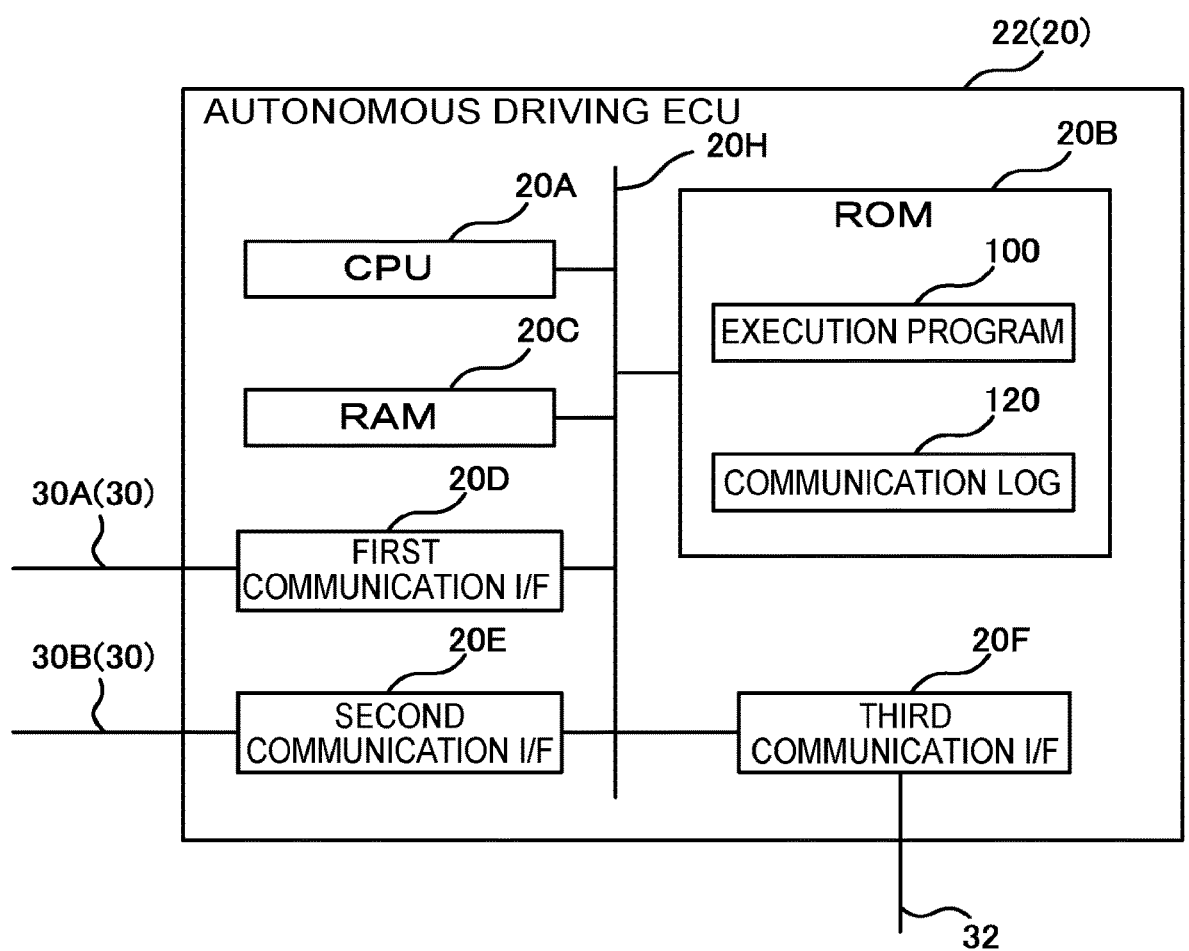
FIG. 2 is a block drawing showing hardware structures of an autonomous driving ECU of the embodiment.

As shown in FIG. 2, the ECU 20 is structured to include a CPU (Central Processing Unit) 20A, a ROM (Read Only Memory) 20B, a RAM (Random Access Memory) 20C, a first communication I/F (Inter Face) 20D, a second communication I/F 20E, and a third communication I/F 20F. The CPU 20A, the ROM 20B, the RAM 20C, the first communication I/F 20D, the second communication I/F 20E, and the third communication I/F 20F are connected so as to be able to communicate with one another via an internal bus 20H. The CPU 20A is an example of the processor, and the RAM 20C is an example of the memory.

The CPU 20A is a central computing processing unit, and executes various programs and controls respective sections. Namely, the CPU 20A reads-out programs from the ROM 20B, and executes the programs by using the RAM 20C as a workspace.

The ROM 20B that serves as the storage stores various programs and various data. In the present embodiment, an execution program 100 is stored in the ROM 20B. The execution program 100 is a program for carrying out attack handling processing that is described later. Further, a communication log 120 is stored in the ROM 20B. The communication log 120 includes "attack information" that relates to security attacks such as unauthorized access to the first communication I/F 20D and the second communication I/F 20E, and the like. The RAM 20C temporarily stores programs or data as a workspace.

The first communication IN 20D is an interface for connection with the other ECUs 20. This interface uses communication standards in accordance with CAN protocol. The first communication I/F 20D is connected to the main bus 30A.

The second communication I/F 20E is an interface for connection with the other ECUs 20. This interface uses communication standards in accordance with CAN protocol. The second communication I/F 20E is connected to the auxiliary bus 30B.

Note that, in the present embodiment, the first communication I/F 20D and the second communication I/F 20E are provided as different interfaces, but the present disclosure is not limited to this, and one communication interface may be connected to the main bus 30A and the auxiliary bus 30B. In this case, the communication of the main bus 30A and the communication of the auxiliary bus 30B are independent, such as the main bus 30A and the auxiliary bus 30B are connected to different channels, or the like.

The third communication I/F 20F is an interface for connection with the DCM 34. This interface uses communication standards in accordance with ethernet®. The third communication I/F 20F is connected to the ethernet bus 32.

Figure 3:
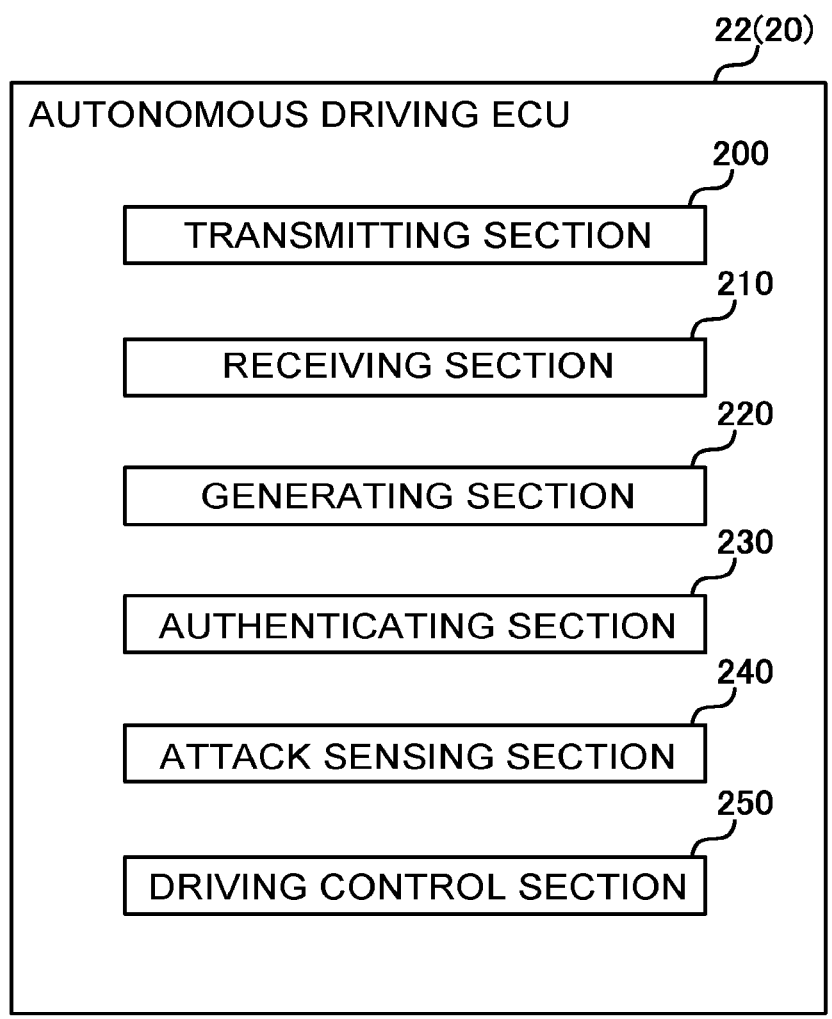
FIG. 3 is a block drawing showing an example of functional structures of the autonomous driving ECU of the embodiment.

FIG. 3 is a block drawing showing an example of the functional structures of the autonomous driving ECU 22. As shown in FIG. 3, the autonomous driving ECU 22 has a transmitting section 200, a receiving section 210, a generating section 220, an authenticating section 230, an attack sensing section 240, and a driving control section 250. These respective functional structures are realized by the CPU 20A reading-out the execution program 100 that is stored in the ROM 20B, and executing the execution program 100.

The transmitting section 200 that serves as the outputting section has the function of transmitting communication frames toward the other ECUs 20. Namely, the transmitting section 200 can output a communication frame to both the main bus 30A and the auxiliary bus 30B. Here, the communication frame includes a CAN ID and communication data. Further, the communication data that is transmitted through the main bus 30A includes a message and a MAC (Message Authentication Code) that is an authentication code. Moreover, the communication data that is transmitted through the auxiliary bus 30B includes a message, and does not include a MAC.

The receiving section 210 that serves as the receiving section has the function of receiving communication frames from the other ECUs 20. Namely, the receiving section 210 can acquire communication frames from both the main bus 30A and the auxiliary bus 30B.

The generating section 220 has the function of generating a MAC from predetermined data by using an encryption key. In a case in which the ECU 20 is at the transmitting side, the generating section 220 executes computing processing on the basis of the message to be transmitted and the encryption key, and generates the MAC. On the other hand, in a case in which the ECU 20 is at the receiving side, the generating section 220 executes computing processing on the basis of the encryption key and the message that was received from the ECU 20 at the transmitting side, and generates a MAC for verification. A common key that is used in common at the transmitting side and the receiving side is used as the encryption key in the present embodiment.

The authenticating section 230 has the function of authenticating the message. The authenticating section 230 authenticates the message in a case of comparing the MAC included in the received communication data and the MAC for verification generated from the received message, and the both match.

The attack sensing section 240 has the function of sensing an attack on the in-vehicle busses 30. The attack sensing section 240 judges that there is an attack state in a case in which the number of non-matchings between MACs, which are in communication data received within a predetermined time period, and the MACs for verification is greater than or equal to a predetermined number of times. Further, the attack sensing section 240 senses an attack on the in-vehicle busses 30 by using a known method such as error checking in CAN protocol, or the like.

The driving control section 250 has the function of carrying out control of autonomous driving of the vehicle 12. The driving control section 250 acquires data relating to the vehicle 12 from the network N and the recognition sensors 44 installed in the vehicle 12 and the like, and creates a traveling plan for the vehicle 12 on the basis of the acquired data, and generates control signals for controlling the actuators 40. Further, in a case in which the attack sensing section 240 senses that either one of the in-vehicle busses 30 is under attack, the driving control section 250 effects control such that control signals are transmitted through the other in-vehicle bus 30 that is not under attack. Due thereto, the driving control section 250 either hands over driving from autonomous driving to manual driving and returns the driving of the vehicle 12 to the driver, or quickly stops the vehicle 12 in a safe place and ends the autonomous driving.

(ECUs for Driving Control)

The steering ECU 24 and the braking ECU 26 that are the ECUs 20 for driving control differ from the autonomous driving ECU 22 with respect to the following points. Note that the other structures and functions are the same as those of the autonomous driving ECU 22, and detailed description thereof is omitted.

Figure 4:
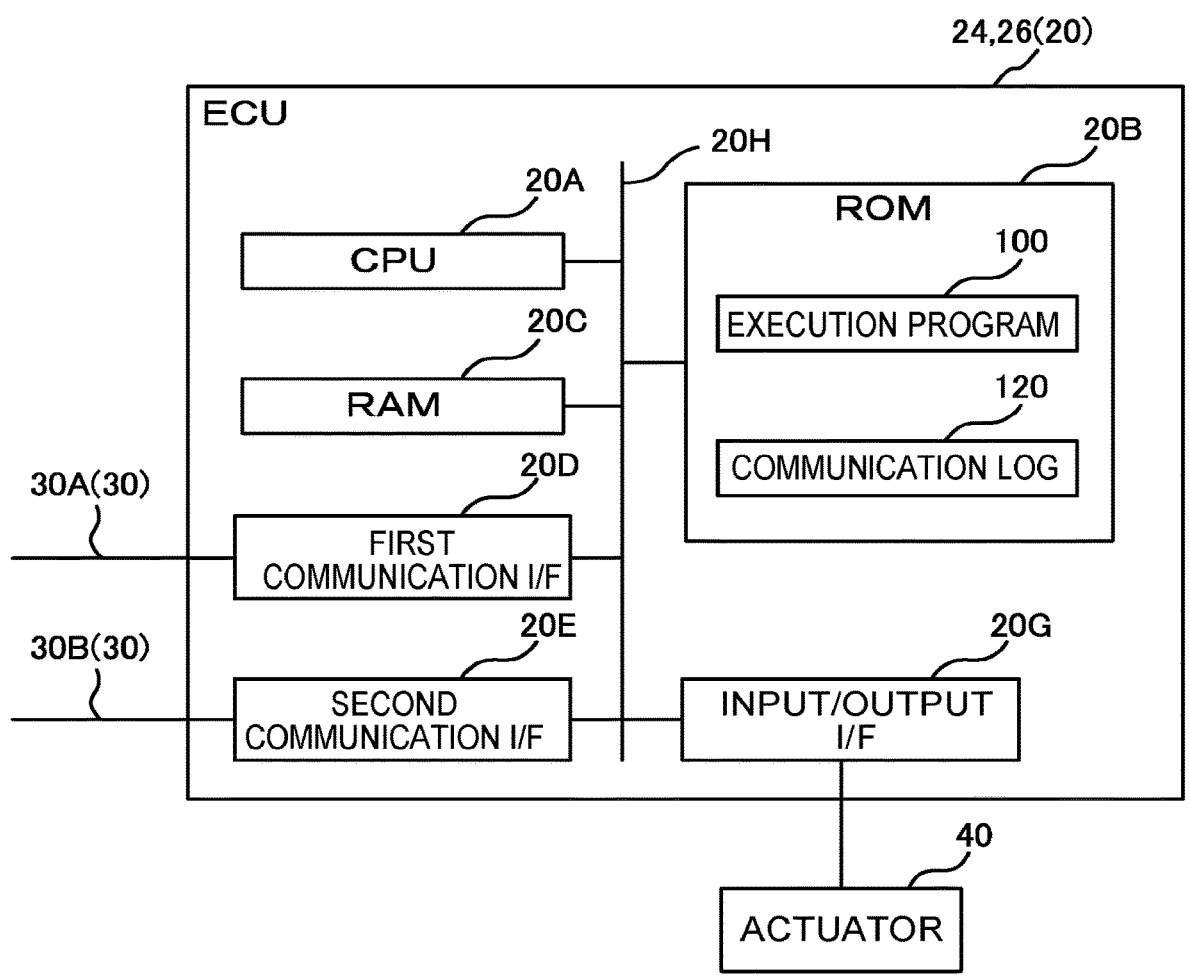
FIG. 4 is a block drawing showing hardware structures of an ECU for driving control of the embodiment.

As shown in FIG. 4, the ECU 20 for driving control has an input/output I/F 20G in place of the third communication I/F 20F. The input/output I/F 20G is an interface for communicating with sensors such as the actuators 40 and the like. In FIG. 4, only one of the actuators 40 is connected, but the present disclosure is not limited to this, and plural actuators 40 and other sensors may be connected.

Figure 5:
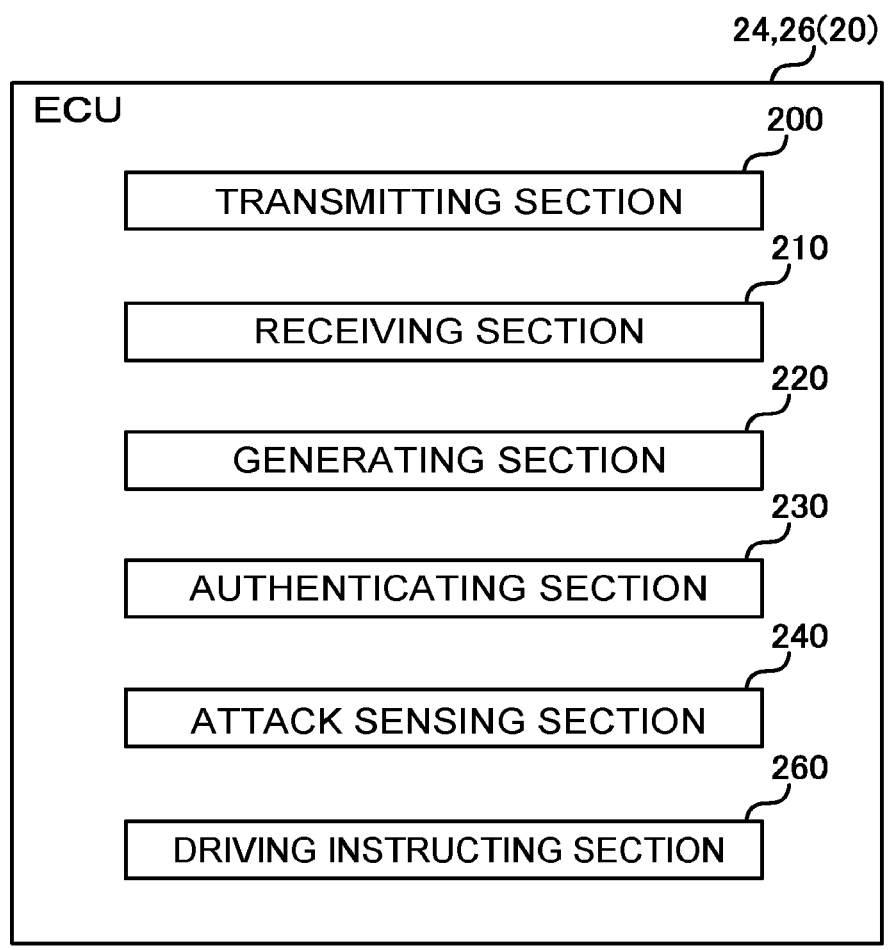
FIG. 5 is a block drawing showing an example of functional structures of the ECU for driving control of the embodiment.

Further, as shown in FIG. 5, accompanying the execution of the execution program 100, the ECU 20 for driving control has the transmitting section 200, the receiving section 210, the generating section 220, the authenticating section 230, the attack sensing section 240, and a driving instructing section 260.

The driving instructing section 260 has the function of driving the respective actuators 40 on the basis of the control signals that are included in the messages received at the receiving section 210. For example, the driving instructing section 260 of the steering ECU 24 drives the actuator 40 and turns the steering wheel in accordance with the turn angle amount of the steering that is included in a control signal. Further, for example, the braking ECU 26 drives the actuator 40 and brakes the respective wheels in accordance with the braking amount that is included in a control signal.

(Flow of Control)

An example of the flow of the attack handling processings that is executed by the autonomous driving ECU 22 in the present embodiment is described in the flowchart of FIG. 6.

In step S100 of FIG. 6, the CPU 20A sets the main bus 30A and the auxiliary bus 30B in states in which communication is possible.

In step S101, the CPU 20A executes autonomous driving control. Namely, the CPU 20A outputs a control signal, to which a MAC is appended, to the main bus 30A, and outputs a control signal, to which a MAC is not appended, to the auxiliary bus 30B. Due thereto, the steering ECU 24 and the braking ECU 26 that have received the control signals drive the actuators 40 and carry out autonomous driving.

Note that, at the steering ECU 24 and the braking ECU 26, the control signals are acquired from both the main bus 30A and the auxiliary bus 30B, but, at usual times when the in-vehicle busses 30 are not under attack, the control signals that are acquired from the auxiliary bus 30B are used. Further, control signals for the body system, such as the turning on and turning off of the lamps, and the like, are acquired from the main bus 30A.

In step S102, the CPU 20A judges whether or not the main bus 30A is under attack. If the CPU 20A judges that the main bus 30A is under attack, the CPU 20A proceeds to step S103. On the other hand, if the CPU 20A judges that the main bus 30A is not under attack, the CPU 20A returns to step S101.

In step S103, the CPU 20A ends communication by the main bus 30A.

In step S104, the CPU 20A judges whether or not it is possible to hand driving over from autonomous driving to manual driving. For example, in a case in which the driver is in an appropriate driving posture, the CPU 20A can judge that it is possible to hand driving over from autonomous driving to manual driving. If the CPU 20A judges that handing-over is possible, the CPU 20A moves on to step S105. On the other hand, if the CPU 20A judges that handing-over is not possible, the CPU 20A moves on to step S106.

In step S105, the CPU 20A executes handing-over processing. Concretely, the CPU 20A alerts the driver of the vehicle 12 for predetermined time period, and thereafter, hands the driving over to the driver.

In step S106, the CPU 20A carries out control that stops the vehicle 12. Namely, the CPU 20A quickly stops the vehicle 12 in a safe place.

In step S107, the CPU 20A stops autonomous driving. Namely, the CPU 20A confirms the completion of handing-over or the stopping of the vehicle 12, and thereafter, ends the autonomous driving. Then, the CPU 20A ends the attack handling processing.

(Overview of Embodiment)

In the vehicle control system 10 of the present embodiment, due to the autonomous driving ECU 22 transmitting control signals to the ECUs 20 for driving control, the ECUs 20 for driving control drive the actuators 40, and cause the vehicle 12 to travel. In the present embodiment, there are provided the main bus 30A and the auxiliary bus 30B that connect the ECUs 20, which include the autonomous driving ECU 22 and the ECUs 20 for driving control, such that the ECUs 20 can communicate with one another. Here, the main bus 30A can communicate with the network N through the DCM 34, and can communicate with the exterior through the central GW 38 and the DLC 42. On the other hand, the auxiliary bus 30B is independent of the main bus 30A, and is structured as a network that is cut-off from the vehicle exterior.

In the present embodiment, the receiving sections 210 of the ECUs 20 for driving control can receive, from both the main bus 30A and the auxiliary bus 30B, the control signals that the transmitting section 200 of the autonomous driving ECU 22 outputted to both the main bus 30A and the auxiliary bus 30B. Therefore, in accordance with the present embodiment, even in a case in which an abnormality arises in communication of the main bus 30A that is connected so as to be able to communicate with the network N at the vehicle exterior, control signals can be transferred from the autonomous driving ECU 22 to the ECUs 20 for driving control by the auxiliary bus 30B. Namely, the vehicle control system 10 of the present embodiment has redundancy in communications.

In the vehicle control system 10 of the present embodiment, the following processing is executed in a case in which the autonomous driving ECU 22 transmits a control signal to the ECU 20 for driving control. Namely, the transmitting section 200 appends an authentication code, which is generated at the generating section 220, to the control signal and outputs the control signal to the main bus 30A, and outputs the control signal to the auxiliary bus 30B without appending an authorization code thereto. Therefore, for control signals that are transferred through the main bus 30A that is connected to the network N that is at the vehicle exterior so as to be able to communicate therewith, reliability can be ensured by message authentication.

Further, at the main bus 30A, in order to ensure reliability of communication, a region for the MAC is ensured at the communication frame, and transmitting and receiving are carried out together with the message that is originally intended to be transmitted. However, in the case of communication in accordance with CAN protocol, the amount of data that can be communicated is reduced by an amount corresponding to the amount of the region for the MAC. Further, the computing capacity of the ECU 20 is expended by generating a MAC or a MAC for verification at each ECU 20, or by authenticating a message that compares the MAC and the MAC for verification, or the like. As compared therewith, at the auxiliary bus 30B at which communication with the network N at the vehicle exterior is not possible, transmitting and receiving of control signals are carried out without carrying out message authentication, and the communication load of each of the ECUs 20 can thereby be reduced. As described above, in accordance with the present embodiment, ensuring of reliability of communication, and a reduction in the communication load, can both be devised at the system on the whole.

In the present embodiment, in a case in which the attack sensing sections 240, which are provided at the respective ECUs 20, sense an attack on the main bus 30A, the communication between the autonomous driving ECU 22 and the ECUs 20 for driving control is carried out on the auxiliary bus 30B, with the main bus 30A being cut-off. In accordance with the present embodiment, by providing the function of sensing an attack on the main bus 30A at each of the ECUs 20, the accuracy of sensing at the system on the whole can be improved. Further, in the present embodiment, in a case in which there is an attack on the main bus 30A from the exterior through the central GW 38, autonomous driving is not affected because control at usual times utilizes communication on the auxiliary bus 30B. Further, in a case in which there is an attack in the midst of autonomous driving, communication during autonomous driving becoming impossible can be prevented by ending the autonomous driving safely by using communication on the auxiliary bus 30B.

In accordance with the present embodiment, the processing load on each of the ECUs 20 can be reduced by transmitting control signals relating to autonomous driving via the auxiliary bus 30B that is independent from the exterior, and the reliability of the signals can be improved by transmitting control signals that relate to other than autonomous driving via the main bus 30A.

(Notes)

Note that any of various types of processors other than a CPU may execute the respective processings that the CPUs 20A execute by reading-in software (programs) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the respective processings may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which the programs are stored in advance (are installed) on a non-transitory recording medium that can be read by a computer. For example, the execution program 100 at the ECU 20 of the vehicle 12 is stored in advance in the ROM 20B. However, the present disclosure is not limited to this, and the respective programs may be provided in the form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

The flow of processings described in the above embodiment also is an example, and unnecessary steps may be deleted, new steps may be added, or the order of processings may be rearranged, within a scope that does not depart from the gist of the present disclosure.

What is claimed is:

1. A vehicle control system comprising:
    a driving control device that includes a first processor, and that controls a drive component for vehicle traveling that is provided at a vehicle;
    a control instructing device that includes a second processor, and that controls the driving control device based on control signals transmitted to the driving control device;
    a first communication path that connects a plurality of control devices, which include the control instructing device and the driving control device, such that the plurality of control devices are capable to communicate with one another, and that is connected to a network external to the vehicle so as to be able to communicate therewith; and
    a second communication path that connects the plurality of control devices, which include the control instructing device and the driving control device, such that the plurality of control devices are capable to communicate with one another, the second communication path being independent from the first communication path and being a network that is cut off from the network external to the vehicle,
    wherein the vehicle control system is structured such that:
    the second processor is capable to:
        output the control signals to both the first communication path and the second communication path,
        generate an authentication code based on the control signals,
        output the control signals, to which the authentication code is appended, to the first communication path, and
        output the control signals, without the authentication code appended thereto, to the second communication path,
        control a driving of the vehicle based on the outputted control signals, and
    the first processor is capable to receive the control signals from both the first communication path and the second communication path.

2. The vehicle control system of claim 1, wherein:
    the first processor and the second processor sense an attack on the first communication path, and
    in a case in which at least one of the first processor or the second processor senses the attack, the second processor carries out communication with the driving control device via only the second communication path.

3. The vehicle control system of claim 2, wherein the first processor and the second processor sense the attack in a case in which a predetermined number of times, within a predetermined time period, of non-matchings of the authentication code and the authentication code that is stored in advance is greater than or equal to the predetermined number of times.

4. The vehicle control system of claim 1, wherein:
    the control instructing device is an autonomous driving ECU, and
    the first processor acquires control signals, which relate to autonomous driving, from the control instructing device via the second communication path, and is capable to acquire control signals other than those relating to autonomous driving, from the control instructing device via the first communication path.

5. A data transmitting method of a control instructing device, the method comprising:
    controlling a drive component for vehicle traveling that is provided at a vehicle,
    transmitting control signals to a driving control device;
    generating an authentication code based on the control signals;
    outputting a control signal, to which the authentication code is appended, to a first communication path that connects a plurality of control devices, which include the control instructing device and the driving control device, such that the plurality of control devices are capable to communicate with one another, the first communication path being connected to a network external to the vehicle so as to be able to communicate therewith, and that outputs the control signal, without the authentication code appended thereto, to a second communication path that connects a plurality of control devices, which include the control instructing device and the driving control device, such that the plurality of control devices are capable communicate with one another, the second communication path being independent from the first communication path and being a network that is cut off from the network external to the vehicle, and
    controlling a driving of the vehicle based on the outputted control signal.

6. A non-transitory recording medium on which is recorded a program, the program being executable by a computer to perform processing comprising:

controlling a drive component for vehicle traveling that is provided at a vehicle, transmitting control signals to a driving control device;

generating an authentication code based on the control signals; and outputting a control signal, to which the authentication code is appended, to a first communication path that connects a plurality of control devices, which include the control instructing device and the driving control device, such that the plurality of control devices are capable to communicate with one another, the first communication path being connected to a network external to the vehicle so as to be able to communicate therewith, and that outputs the control signal, without the authentication code appended thereto, to a second communication path that connects a plurality of control devices, which include the control instructing device and the driving control device, such that the plurality of control devices are capable to communicate with one another, the second communication path being independent from the first communication path and being a network that is cut off from the network external to the vehicle, and controlling a driving of the vehicle based on the outputted control signal.

* * * * *